(12) United States Patent
Gan et al.

(10) Patent No.: US 12,310,348 B2
(45) Date of Patent: May 27, 2025

(54) INTELLIGENT FORCIPOMYIA TAIWANA MONITORING AND MANAGEMENT SYSTEM

(71) Applicant: FENG CHIA UNIVERSITY, Taichung (TW)

(72) Inventors: Yee Siang Gan, Taichung (TW); Shih-Kai Fan, Taichung (TW); Ching-Yun Tseng, Taichung (TW); Sze-Teng Liong, Taichung (TW); Yu-Ting Sheng, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 274 days.

(21) Appl. No.: 18/145,015

(22) Filed: Dec. 21, 2022

(65) Prior Publication Data

US 2023/0210102 A1 Jul. 6, 2023

(30) Foreign Application Priority Data

Jan. 3, 2022 (TW) .................................. 111100114

(51) Int. Cl.
*A01M 1/08* (2006.01)
*A01M 1/02* (2006.01)
(Continued)

(52) U.S. Cl.
CPC .............. *A01M 1/026* (2013.01); *A01M 1/08* (2013.01); *G06T 7/246* (2017.01);
(Continued)

(58) Field of Classification Search
CPC .......... A01M 1/00; A01M 1/02; A01M 1/023; A01M 1/026; A01M 1/04; A01M 1/06;
(Continued)

(56) References Cited

U.S. PATENT DOCUMENTS

| 983,468 | A | * | 2/1911 | Wood | ................. | A01M 1/2094 |
| | | | | | | 43/113 |
| 988,476 | A | * | 4/1911 | La Baum | .............. | A01M 1/106 |
| | | | | | | 43/113 |

(Continued)

FOREIGN PATENT DOCUMENTS

| CH | | 175581 A | * | 3/1935 |
| CN | | 109784239 A | * | 5/2019 |

(Continued)

*Primary Examiner* — Darren W Ark
(74) *Attorney, Agent, or Firm* — Guice Patents PLLC

(57) ABSTRACT

An intelligent *Forcipomyia taiwana* monitoring and management system comprises: a catching mechanism grabbing a to-be-identified target; a database storing a datum comprising pictures of a flying insect category; a model training module using the pictures to establish a training model; an image capture module shooting an image including the target; an identifying module selecting a first segmented region including the target by using YOLO detection framework technology, extracting a first identification feature from the target, and inputting the feature into the training model for deep learning to identify a flying insect category to which the target belongs and produce an identification result; a counting module recording a number of the target into the database; and a predictive tracking module obtaining a marked object based on the result marked with the target identified in the image, and using a Monte-Carlo category algorithm to track and predict the object.

5 Claims, 2 Drawing Sheets

(51) Int. Cl.
  *G06T 7/246* (2017.01)
  *G06V 10/774* (2022.01)
  *G06V 40/10* (2022.01)

(52) U.S. Cl.
  CPC .. *G06T 2207/20081* (2013.01); *G06V 10/774* (2022.01); *G06V 40/10* (2022.01)

(58) Field of Classification Search
  CPC .......... A01M 1/08; A01M 1/10; A01M 1/106; A01M 1/12
  USPC ............................................ 43/107, 113, 139
  See application file for complete search history.

(56) References Cited

U.S. PATENT DOCUMENTS

| | | | | |
|---|---|---|---|---|
| 2,046,430 | A * | 7/1936 | Rutherford | A01M 1/14 43/115 |
| 3,058,257 | A * | 10/1962 | Brophy | A01M 1/08 55/472 |
| 3,196,577 | A * | 7/1965 | Plunkett | A01M 1/08 43/139 |
| 3,201,893 | A * | 8/1965 | Gesmar | A01M 1/08 43/139 |
| 3,305,965 | A * | 2/1967 | Cornell, III | A01M 1/08 43/139 |
| 3,319,375 | A * | 5/1967 | Harvath | A01M 1/20 43/118 |
| 4,788,789 | A * | 12/1988 | Boobar | A01M 1/08 D22/122 |
| 6,134,826 | A * | 10/2000 | Mah | A01M 1/223 43/99 |
| 8,755,571 | B2 * | 6/2014 | Tsai | G06V 20/66 382/128 |
| 9,883,666 | B1 * | 2/2018 | Conklin | A01M 1/145 |
| 10,524,461 | B1 * | 1/2020 | Files | G01S 13/888 |
| 11,354,546 | B2 * | 6/2022 | Criswell | G06T 7/70 |
| 11,490,609 | B2 * | 11/2022 | Cherukumalli | A01M 1/023 |
| 11,547,106 | B2 * | 1/2023 | Acharya | A01M 1/106 |
| 11,723,349 | B2 * | 8/2023 | Lepek | A01K 67/033 119/6.5 |
| 12,022,820 | B1 * | 7/2024 | Zhang | A01M 1/04 |
| 12,038,969 | B2 * | 7/2024 | Desnoyer | G06N 3/045 |
| 2003/0000127 | A1 * | 1/2003 | Smith | A01M 1/145 43/113 |
| 2006/0150470 | A1 * | 7/2006 | Ronnau | H04M 11/002 43/132.1 |
| 2009/0025275 | A1 * | 1/2009 | Cohnstaedt | A01M 1/04 43/113 |
| 2013/0174474 | A1 * | 7/2013 | Blazer | A01M 7/005 43/132.1 |
| 2014/0169138 | A1 * | 6/2014 | Lee | A01M 1/24 43/2 |
| 2014/0226860 | A1 * | 8/2014 | Hyde | A01M 1/026 382/103 |
| 2015/0216158 | A1 * | 8/2015 | Mizrach | A01M 1/026 43/107 |
| 2015/0234049 | A1 * | 8/2015 | Weber-Grabau | H01J 37/32935 356/432 |
| 2016/0245916 | A1 * | 8/2016 | Weber-Grabau | H01J 37/32917 |
| 2017/0094960 | A1 * | 4/2017 | Sasaki | A01M 1/023 |
| 2017/0112116 | A1 * | 4/2017 | Ji | H04N 23/20 |
| 2017/0273291 | A1 * | 9/2017 | Yoo | G06V 40/10 |
| 2017/0354135 | A1 * | 12/2017 | Ching | A01M 1/106 |
| 2018/0121764 | A1 * | 5/2018 | Zha | G06V 10/255 |
| 2018/0279598 | A1 * | 10/2018 | Hur | A01M 1/106 |
| 2019/0133106 | A1 * | 5/2019 | Eom | A01M 1/08 |
| 2019/0281805 | A1 * | 9/2019 | Jaffrey | A01M 29/12 |
| 2020/0000079 | A1 * | 1/2020 | Liu | A01M 1/04 |
| 2020/0093115 | A1 * | 3/2020 | Files | G06V 40/20 |
| 2020/0113164 | A1 * | 4/2020 | Zamboni | A01M 1/023 |
| 2020/0125877 | A1 * | 4/2020 | Phan | G06N 20/10 |
| 2020/0154685 | A1 * | 5/2020 | Lepek | G06V 40/10 |
| 2020/0178511 | A1 * | 6/2020 | Tang | G06V 20/52 |
| 2020/0229420 | A1 * | 7/2020 | Ben Hamozeg | G01G 19/42 |
| 2020/0245604 | A1 * | 8/2020 | CHerukumalli | A01M 1/106 |
| 2020/0250482 | A1 * | 8/2020 | Lee | G06V 20/20 |
| 2020/0281164 | A1 * | 9/2020 | Lepek | A01M 1/026 |
| 2021/0209352 | A1 * | 7/2021 | Fryshman | A01M 1/20 |
| 2021/0219535 | A1 * | 7/2021 | Romanova | A01M 1/023 |
| 2021/0251209 | A1 * | 8/2021 | Benedek | G06V 20/52 |
| 2021/0315192 | A1 * | 10/2021 | Wiesenberg | A01M 1/226 |
| 2021/0329902 | A1 * | 10/2021 | Acharya | A01M 1/106 |
| 2021/0360204 | A1 * | 11/2021 | Wollenhaupt | A01M 1/026 |
| 2021/0400943 | A1 * | 12/2021 | Cherukumalli | A01M 1/106 |
| 2022/0104474 | A1 * | 4/2022 | Chellappan | H04R 1/08 |
| 2022/0217962 | A1 * | 7/2022 | Romanova | A01M 1/106 |
| 2022/0245381 | A1 * | 8/2022 | Takla | G06N 3/088 |
| 2022/0361471 | A1 * | 11/2022 | Patch | H04N 7/188 |
| 2022/0369620 | A1 * | 11/2022 | Mangler | H04B 1/04 |
| 2022/0413166 | A1 * | 12/2022 | Saccomanno | A23B 7/015 |
| 2023/0247978 | A1 * | 8/2023 | Azaria | B64U 20/70 43/124 |
| 2023/0385654 | A1 * | 11/2023 | Johnson | G06Q 10/04 |
| 2024/0215562 | A1 * | 7/2024 | Romanova | A01M 1/106 |
| 2024/0276966 | A1 * | 8/2024 | Romanova | A01M 1/08 |
| 2024/0371395 | A1 * | 11/2024 | Bick | A01M 1/026 |

FOREIGN PATENT DOCUMENTS

| | | | | |
|---|---|---|---|---|
| CN | 208956778 | U * | 6/2019 | ............ A01M 1/08 |
| CN | 111062971 | A * | 4/2020 | ........... G06N 3/0454 |
| CN | 112200368 | A * | 1/2021 | ............ A01M 1/08 |
| CN | 117392609 | A * | 1/2024 | |
| JP | 2020110084 | A * | 7/2020 | |
| KR | 20020017584 | A * | 3/2002 | |
| KR | 20090005532 | U * | 6/2009 | |
| WO | WO-2016135765 | A1 * | 9/2016 | ........... A01M 1/023 |
| WO | WO-2019221014 | A1 * | 11/2019 | |

\* cited by examiner

INTELLIGENT FORCIPOMYIA TAIWANA MONITORING AND MANAGEMENT SYSTEM

BACKGROUND OF THE INVENTION

1. Technical Field

The invention is related to catching mosquitoes or midges, and more particularly to an intelligent *Forcipomyia taiwana* monitoring and management system.

2. Description of Related Art

Taiwanese small black midge, also known as *Forcipomyia taiwana*, is a blood-sucking insect of the family Ceratopogonidae, the genus *Forcipomyia*. It was first seen in Taichung County, and once disappeared due to the destruction of its habitat. However, in recent years, the distribution range of *Forcipomyia taiwana* has gradually expanded and spread, and has caused serious ecological problems in Taiwan.

The current hazard assessment of *Forcipomyia taiwana* mainly uses human experiments to measure the density of *Forcipomyia taiwana*, that is, to calculate a number of *Forcipomyia taiwana* that stop on a bare calf and are captured, removed or killed within 20 minutes. The hazard levels are classified by the number of *Forcipomyia taiwana*, 0: no harm; 1-5: mild harm; 6-20: moderate harm; 21-50: moderately severe harm; 51-100: severe harm; more than 100: extremely severe harm.

Although *Forcipomyia taiwana* is a harassing insect and rarely carries vector-borne diseases, and there is no risk of infectious diseases, being bitten by *Forcipomyia taiwana* will cause serious allergic reactions such as redness, swelling, pain, and itching, and may last for 1 week, even 1 month, and a small number of people may have anaphylaxis, or have serious symptoms such as fever or lymphadenectasis.

Moreover, in the method of calculating a number of *Forcipomyia taiwana* in hazard assessment, a number of bites on the calf is manually observed and counted, which often has problems of overlapping bites and difficulty in identification. Obviously, this method of data collection is not only time-consuming and laborious, but also easy to produce large errors. Therefore, the current conventional method of assessing the harm of *Forcipomyia taiwana* is not a good strategy, and improvement is necessary.

SUMMARY OF THE INVENTION

Therefore, a main object of the invention is to provide an intelligent *Forcipomyia taiwana* monitoring and management system capable of identifying *Forcipomyia taiwana* and automatically measuring a number of *Forcipomyia taiwana* using intelligent computing technology, in addition to improving errors caused by manual calculations, the invention also solves the problems derived from the conventional *Forcipomyia taiwana* hazard assessment and measurement.

Another object of the invention is to provide an intelligent *Forcipomyia taiwana* monitoring and management system capable of marking mosquitoes or midges to avoid double counting using optical image tracking technology.

In order to achieve the above-mentioned objects, the intelligent *Forcipomyia taiwana* monitoring and management system provided by the invention has main technical features that lie in using a catching mechanism to grab a flying insect as a to-be-identified target, and on this basis, the system further comprises a database, a model training module, an image capture module, an identifying module, a counting module and a predictive tracking module, wherein the database stores a preset datum, the datum comprises at least a predetermined number of example pictures of at least one flying insect category; the model training module uses the example pictures to perform calculations to establish a training model; the image capture module shoots an image including the to-be-identified target; the identifying module selects a first segmented region including the to-be-identified target from the image by using YOLO (You Only Look Once) detection framework technology, extracts at least one first identification feature from the to-be-identified target in the first segmented region, and inputs the first identification feature into the training model for deep learning of image identification in order to identify a flying insect category to which the to-be-identified target belongs and produce an identification result; the counting module records a number of the to-be-identified target included in the identification result into the database; and the predictive tracking module obtains a marked object based on the identification result marked with the to-be-identified target that has been identified in the image, and uses a Monte-Carlo category algorithm to track and predict the marked object, thereby reducing a misjudgment rate in a tracking process.

Wherein the catching mechanism has a housing, a first opening and a negative pressure device, the first opening is disposed on one side of the housing to enable an inner space of the housing to communicate externally through the first opening, the negative pressure device is disposed on the housing, so that an air pressure in the inner space is lower than an external air pressure, and the to-be-identified target can be sucked into the inner space from an external environment through the first opening.

In one embodiment, the catching mechanism further comprises a partition, a through hole and a second opening, wherein the partition is disposed in the housing and divides the inner space into a first chamber and a second chamber, and enables the first chamber communicate externally through the first opening; the through hole is penetratingly disposed on the partition to enable the first chamber communicate with the second chamber; and the second opening corresponds to a position of the second chamber and is penetratingly provided on the housing to enable the second chamber communicate externally through the second opening.

Further, in order to prevent a captured flying insect from escaping, the catching mechanism further comprises a tapered first sleeve, a tapered second sleeve and a connecting pipe, wherein the first sleeve is located in the first chamber, one end opening of the first sleeve is abutted against and connected to a position of the housing corresponding to the first opening to enable the first sleeve communicate externally through the first opening, and an inner diameter of the first sleeve gradually decreases toward a direction of the second chamber; the second sleeve is located in the first chamber, one end opening of the second sleeve is abutted against and connected to a position of the partition corresponding to the through hole to enable the second sleeve communicate with the second chamber through the through hole, and an inner diameter of the second sleeve gradually increases toward a direction of the second chamber; the connecting pipe is bridged between the first sleeve and the second sleeve, so that the first sleeve and the second sleeve communicate with each other, and an inner diameter of the connecting pipe is equal to a minimum inner diameter of the first sleeve or equal to a minimum inner diameter of the second sleeve. Accordingly, through the aforementioned structural design of the first sleeve, the connecting pipe, and the second sleeve, a pressure difference formed by changes in inner diameters of the pipes is capable of preventing the flying insect from reversely escaping from the first opening.

In one embodiment, the catching mechanism further comprises a filter part covering the second opening and only allowing a fluid to pass through.

In one embodiment, the negative pressure device is a fan located in the second chamber and disposed on the partition corresponding to a position of the through hole.

In order to avoid the problem of increasing a misjudgment rate of image identification due to influence of uncertain factors such as ambient light luminosity during a tracking process of deep learning network model, the invention uses a Monte-Carlo category algorithm to track the marked object, especially aiming at Forcipomyia taiwana that flies non-linearly and continuously and rapidly. Specifically, a number of the image is two, and the images are arranged from front to back according to a time sequence. The predictive tracking module uses a coordinate position of the marked object in the image arranged in front as an origin, the identifying module uses the YOLO detection frame technology to randomly sample a plurality of second segmented regions around a position of the origin in the image arranged at back, extracts a second identification feature from the second segmented regions respectively, compares and analyzes the second identification features to find the one with a highest degree of similarity with the first identification feature, and a coordinate position of the second segmented region to which the second identification feature with the highest degree of similarity belongs is defined as a predictive position for using as a tracking prediction result of the marked object.

In one embodiment, the flying insect is a Forcipomyia taiwana or a midge or a mosquito.

In one embodiment, the invention further comprises an adjustable light-emitting module disposed on the housing and capable of adjusting a wavelength of a light source emitted by the light-emitting module to attract the flying insect.

DETAILED DESCRIPTION OF THE INVENTION

First of all, the nouns mentioned in this specification are explained as follows.

The term "calculation" or "algorithm" in this invention refers to a program that is capable of comparing and calculating input data, and the program refers to using various applicable statistical analysis and artificial intelligence algorithms and devices, such as regression analysis method, hierarchical analysis method, cluster analysis method, neural network algorithm, genetic algorithm, machine learning algorithm, deep learning algorithm.

Figure 1:
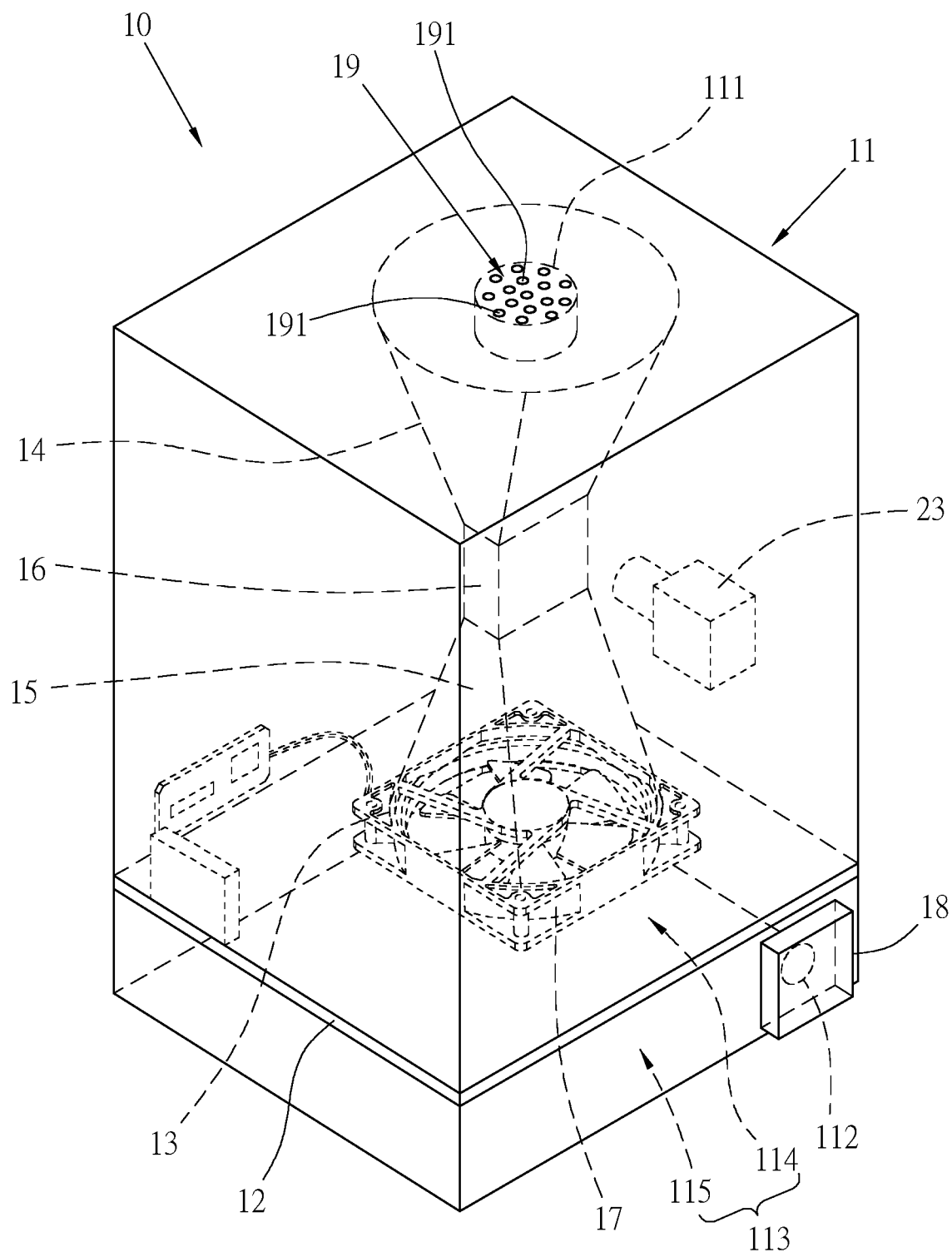
FIG. 1 is a perspective view of an intelligent Forcipomyia taiwana monitoring and management system according to a preferred embodiment of the invention.
Figure 2:
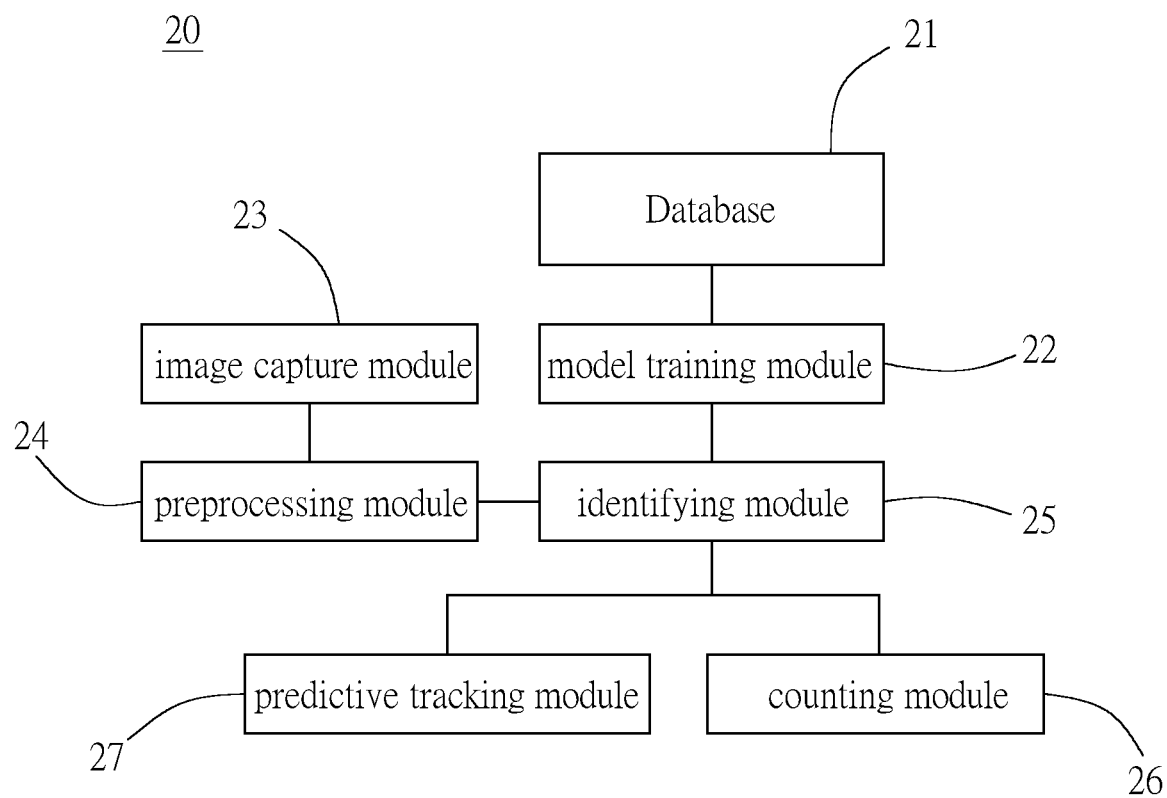
FIG. 2 is a system block diagram of an identifying mechanism of a preferred embodiment of the invention.

Please refer to FIG. 1 and FIG. 2, an intelligent Forcipomyia taiwana monitoring and management system of a preferred embodiment of the invention is provided, which mainly comprises a catching mechanism 10 and an identifying mechanism 20.

The catching mechanism 10 is used to catch a to-be-identified target. In this embodiment, the to-be-identified target is a flying insect belonging to the order Diptera of the class Insecta. Wherein the catching mechanism 10 has a housing 11, a partition 12, a through hole 13, a first opening 111, a second opening 112, a first sleeve 14, a second sleeve 15, a connecting pipe 16, a negative pressure device 17, a filter part 18 and an adjustable light-emitting module.

The housing 11 is in the shape of a cuboid in this embodiment, but the shape of the housing 11 is not limited to a cuboid, and has an inner space 113. The partition 12 is disposed in the housing 11 and divides the inner space 113 into a first chamber 114 and a second chamber 115. The through hole 13 is penetratingly disposed on the partition 12 to enable the first chamber 114 communicate with the second chamber 115.

The first opening 111 corresponds to a position of the first chamber 114 and is penetratingly disposed on one side of the housing 11 so that the first chamber 114 is capable of communicating externally through the first opening 111. In this embodiment, the first opening 111 is further covered with a sieve plate 19, a plate body of the sieve plate 19 is provided with a plurality of sieve holes 191, and inner diameters of the sieve holes 191 are designed to allow flying insects to pass through.

The second opening 112 corresponds to a position of the second chamber 115 and is penetratingly disposed on another side of the housing 11 so that the second chamber 115 is capable of communicating externally through the second opening 112.

The first sleeve 14 is located in the first chamber 114, one end opening of the first sleeve 14 is abutted against and connected to a position of the housing 11 corresponding to the first opening 111, and an inner diameter of the opening is not less than an inner diameter of the first opening 111, so that the opening is connected to the first opening 111, and the first sleeve 14 is capable of communicating externally through the first opening 111. Furthermore, an inner diameter of the first sleeve 14 gradually decreases toward a direction of the second chamber 115, forming a tapered shape.

The second sleeve 15 is located in the first chamber 114, one end opening of the second sleeve 15 is abutted against and connected to a position of the partition 12 corresponding to the through hole 13, and an inner diameter of the opening is not less than an inner diameter of the through hole 13, so that the opening is connected to the through hole 13, and the second sleeve 15 is capable of communicating with the second chamber 115 through the through hole 13. Furthermore, an inner diameter of the second sleeve 15 gradually increases toward a direction of the second chamber 115, forming a tapered shape.

The connecting pipe 16 is bridged between the first sleeve 14 and the second sleeve 15, and an inner diameter of the connecting pipe 16 is equal to a minimum inner diameter of the first sleeve 14 and/or equal to a minimum inner diameter of the second sleeve 15.

The negative pressure device 17 is disposed on the housing 11. In this embodiment, the negative pressure device 17 is a fan, which is located in the second chamber 115 and is disposed on the partition 12 corresponding to a position of the through hole 13.

The filter part 18 is disposed on the second opening 112 in a covering manner, and only allows a fluid to pass through. For example, the filter part 18 can be, but is not limited to a filter foam, and the fluid is air.

The housing 11 is provided with the adjustable light-emitting module, and a wavelength of a light source emitted by the light-emitting module can be adjusted to attract specific flying insects around the catching mechanism 10. In other embodiments, a special smell can also be used to attract flying insects into the catching mechanism 10.

With a composition of the above components, when the negative pressure device 17 is in operation, an external air will flow out from the second opening 112 after passing through the first opening 111, the first sleeve 14, the connecting pipe 16, the second sleeve 15, and the second chamber 115. Accordingly, by using the flow of air, an air pressure in the inner space 113 is lower than an external air pressure, so that the to-be-identified target can be sucked into the inner space 113 from an external environment through the first opening 111.

Also, owing to a structural design composed of the first sleeve 14, the connecting pipe 16 and the second sleeve 15, changes in passage cross-sectional areas can be achieved through changes in inner diameters of the sleeves and the pipe to form a pressure difference during flowing of air, thereby preventing trapped flying insects from escaping.

Furthermore, the identifying mechanism 20 comprises a database 21, a model training module 22, an image capture module 23, a preprocessing module 24, an identifying module 25, a counting module 26 and a predictive tracking module 27, and the modules are connected by communication with one another to transmit relevant data, for example, connected by wireless communication modes such as 4G, 5G, WIFI, Bluetooth, NFC or RFID, or connected by wired transmission.

Specifically, the database 21 can be, but is not limited to, a phase-change memory (PRAM), a static random access memory (SRAM), a dynamic random access memory (DRAM), a flash memory disk, a read-only memory (ROM), a random access memory (RAM), a disk drive or a compact disc, and is used to store a preset datum, the datum comprises a predetermined number of example pictures of N flying insect categories, and N is a natural number. In this embodiment, the flying insect category is classified according to various insects belonging to the order Diptera of the class Insecta, such as mosquitoes, midges, flies, horseflies and other flying insects, especially *Forcipomyia taiwana*.

Taking the flying insect category as *Forcipomyia taiwana* as an example, each of the example pictures comprises identification features of head, eyes, mouth parts, antennae, proboscis, thorax, legs, wings, fore wings, hind wings, venation, scale and abdomen of *Forcipomyia taiwana*.

The model training module 22 performs calculations on the example pictures corresponding to each of the N flying insect categories to establish N training models respectively. For example, the invention is mainly used to identify *Forcipomyia taiwana*, and uses pictures of *Forcipomyia taiwana* to calculate a training model exclusively for *Forcipomyia taiwana*.

The image capture module 23 can be, but is not limited to, a video camera, a camera, a device including a charge-coupled device (CCD) or a complementary metal-oxide semiconductor (CMOS), for shooting an image including the to-be-identified target.

The preprocessing module 24 performs image preprocessing on the image, including frames per second (FPS) normalization and grayscale processing to improve a definition of the image, but the technical content of such image preprocessing is well known to a person having ordinary skill in the art, thus it will not be repeated herein.

The identifying module 25 uses YOLO (You Only Look Once) detection framework technology to select a first segmented region including the to-be-identified target from the image, and then extracts at least one first identification feature from the to-be-identified target in the first segmented region, wherein the first identification feature refers to any one of head, eyes, mouth parts, antennae, proboscis, thorax, legs, wings, fore wings, hind wings, venation, scale and abdomen. Then, the identifying module inputs the first identification feature into N different training models, and performs deep learning of image identification respectively in order to identify a flying insect category to which the to-be-identified target belongs and produce an identification result, for example, if the to-be-identified target is *Forcipomyia taiwana*, then the identification result is also *Forcipomyia taiwana*.

In detail, YOLO is a neural network algorithm for object detection, which has the advantages of lightweight computing, fast identification and high accuracy. In this embodiment, the aforementioned algorithm of the identifying module 25 is named as LightNet-Yolo, and refers to shallow convolutional neural network (CNN) architecture of Yolo-Lite (real-time target detection model), and secondary positioning identification technology is used to improve image detection quality. Because the to-be-identified target is *Forcipomyia taiwana*, which is small in size and fast in flight, LightNet-Yolo can clarify an object and save network computation. For example, in the case of Mask R-CNN (object segmentation image analysis algorithm), which is a framework for instance segmentation, the framework is divided into two stages, in a first stage, a rectangle is used to frame and select a range of the to-be-identified target; and in a second stage, the target range is classified and a target category is generated next to the framed range. However, with a same amount of data, because Mask R-CNN uses polygons to frame and select targets, while YOLO uses rectangles to frame and select targets, Mask R-CNN requires twice as much training time as YOLO.

The counting module 26 records a number of the to-be-identified target included in the identification result into the database 21. In addition, data such as its time and distribution location can also be digitized and analyzed more accurately, for example, actual conditions such as time period of appearance and distributed area of the to-be-identified target can be known.

The predictive tracking module 27 obtains a marked object based on the identification result marked with the to-be-identified target that has been identified in the image for tracking and prediction of the marked object. Wherein, in order to avoid the problem of increasing a misjudgment rate of image identification due to influence of uncertain factors such as ambient light luminosity during a tracking process, the invention uses a Monte-Carlo category algorithm to track the marked object, especially aiming at *Forcipomyia taiwana* that flies non-linearly and continuously and rapidly. Specifically, a number of the image is two, and the images are arranged from front to back according to a time sequence. The predictive tracking module 27 uses a coordinate position of the marked object in the image arranged in front as an origin, the identifying module 25 uses the YOLO detection frame technology to randomly sample a plurality of second segmented regions around a position of the origin in the image arranged at back, extracts a second identification feature from the second segmented regions respectively, compares and analyzes the second identification features to find the one with a highest degree of similarity with the first identification feature, and a coordinate position of the second segmented region to which the second identification feature with the highest degree of similarity belongs is defined as a predictive position for using as a tracking prediction result of the marked object.

Wherein an image similarity algorithm (d_score) can be used in degree of similarity to compute a corresponding result, the image similarity algorithm is a known technology, and is not a focus of the invention, so it will not be described in detail.

Furthermore, according to a user's demand, a model algorithm of the training model can be optimized and parameters of related modules can be adjusted to improve an accuracy of identification and tracking.

In addition, the identifying mechanism 20 uses low-power communication technology (such as Bluetooth communication technology) as a basis for data transmission, and uploads its calculation results to the cloud or the Internet to reduce an operating time of manual data collection, and is also capable of achieving an object of real-time monitoring and management. For example, the invention can also cooperate with GPS and other positioning technologies to perform positioning, and at the same time measure and record density, habitat information, distribution and surrounding environment (that is, regional flow of people, temperature, humidity, etc.) of *Forcipomyia taiwana* in real time and transmit the data to a cloud platform or a terminal device (such as a user's mobile phone), so as to be capable of making appropriate environmental improvement plan to deal with *Forcipomyia taiwana*, saving unnecessary waste of resources, and improving an efficiency of environmental improvement. Wherein the terminal device can be, but is not limited to, a computer, a tablet computer, a mobile phone, a TV screen or a dashboard. Moreover, if the identifying mechanism 20 has an abnormal message, an instant alert can be sent to the cloud platform or the terminal device.

In addition, the intelligent *Forcipomyia taiwana* monitoring and management system disclosed in the invention is lightweight and convenient to use in weight and size, can be easily installed anywhere in a field, and can be applied to detect and analyze a number of *Forcipomyia taiwana* in any area. Furthermore, the intelligent *Forcipomyia taiwana* monitoring and management system can further be combined with a portable solar power generation device to timely provide energy required for operation of the system, wherein the portable solar power generation device is composed of solar panels, batteries, LED light bulbs, Bluetooth sensors, USB output ports and a housing, a total power generation capacity thereof is less than 5 watts, in order to achieve objects of energy security, green economy and environmental sustainability.

The above is only a detailed description of the invention through each of the embodiments, without departing from the spirit of the invention, any simple modifications or changes made to the embodiments in the specification by a person having ordinary skill in the art should deemed to be within the scope of the claims.

What is claimed is:

1. An intelligent *Forcipomyia taiwana* monitoring and management system comprising:
    a catching mechanism having a housing, a first opening and a negative pressure device, the first opening being disposed on one side of the housing to enable an inner 5 space of the housing to communicate externally through the first opening, the negative pressure device being disposed on the housing, so that an air pressure in the inner space being lower than an external air pressure to be capable of sucking a to-be-identified target into the inner space from an external environment through the first opening, wherein the to-be-identified target is a flying insect belonging to the order Diptera of the class Insecta;
    a database storing a preset datum, the datum comprising at least a predetermined number of example pictures of at least one flying insect category;
    a model training module using the example pictures to perform calculations to establish a training model;
    an image capture module disposed on the housing for shooting an image including the to-be-identified target;
    an identifying module selecting a first segmented region including the to-be-identified target from the image by using a You Only Look Once detection framework technology, extracting at least one first identification feature from the to-be-identified target in the first segmented region, and inputting the at least one first identification feature into the training model for deep learning of image identification in order to identify a flying insect category to which the to-be-identified target belongs and producing an identification result;
    a counting module recording a number of the to-be-identified target included in the identification result into the database; and
    a predictive tracking module obtaining a marked object based on the identification result marked with the to-be-identified target identified in the image, and using a Monte-Carlo category algorithm to track and predict the marked object, thereby reducing a misjudgment rate in a tracking process;
    wherein the catching mechanism further comprises:
    a partition disposed in the housing and dividing the inner space into a first chamber and a second chamber to enable the first chamber to communicate externally through the first opening;
    a through hole penetratingly disposed on the partition to enable the first chamber to communicate with the second chamber;
    a second opening corresponding to a position of the second chamber and penetratingly provided on the housing to enable the second chamber to communicate externally through the second opening;
    a tapered first sleeve located in the first chamber, one end opening of the first sleeve is abutted against and connected to a position of the housing corresponding to the first opening to enable the first sleeve to communicate externally through the first opening, and an inner diameter of the first sleeve gradually decreases toward a direction of the second chamber;
    a tapered second sleeve located in the first chamber, one end opening of the second sleeve is abutted against and connected to a position of the partition corresponding to the through hole to enable the second sleeve to communicate with the second chamber through the through hole, and an inner diameter of the second sleeve gradually increases toward a direction of the second chamber; and
    a connecting pipe bridged between the first sleeve and the second sleeve, so that the first sleeve and the second sleeve communicate with each other, and an inner diameter of the connecting pipe is equal to a minimum inner diameter of the first sleeve or equal to a minimum inner diameter of the second sleeve.

2. The intelligent *Forcipomyia taiwana* monitoring and management system as claimed in claim 1, wherein a number of the image is two, and the images are arranged from front to back according to a time sequence, the predictive tracking module uses a coordinate position of the marked object in the image arranged in front as an origin, the identifying module uses the You Only Look Once detection frame technology to randomly sample a plurality of second segmented regions around a position of the origin in the image arranged at back, extracts a second identification feature from the second segmented regions respectively, compares and analyzes the second identification features to find the one with a highest degree of similarity with the at least one first identification feature, and a coordinate position of the second segmented region to which the second identification feature with the highest degree of similarity belongs is defined as a predictive position for using as a tracking prediction result of the marked object.

3. The intelligent *Forcipomyia taiwana* monitoring and management system as claimed in claim 1, wherein the flying insect is a *Forcipomyia taiwana* or a midge or a mosquito.

4. The intelligent *Forcipomyia taiwana* monitoring and management system as claimed in claim 1, wherein the catching mechanism further comprises a filter part covering the second opening and only allowing a fluid to pass through.

5. The intelligent *Forcipomyia taiwana* monitoring and management system as claimed in claim 1, wherein the negative pressure device disposed on the housing is a fan located in the second chamber and is disposed on the partition corresponding to a position of the through hole.

\* \* \* \* \*